May 17, 1960 C. COLBERT 2,937,241

NOISE COMPENSATION MEANS IN A MAGNETIC RECORDER

Filed Dec. 18, 1958

INVENTOR.
CHARLES COLBERT

BY

Marechal, Biebel, French & Bugg

ATTORNEYS

United States Patent Office 2,937,241

Patented May 17, 1960

2,937,241

NOISE COMPENSATION MEANS IN A MAGNETIC RECORDER

Charles Colbert, Yellow Springs, Ohio, assignor to Westgate Laboratory, Inc., Yellow Springs, Ohio, a corporation of Ohio Application December 18, 1958, Serial No. 781,392

8 Claims. (Cl. 179—100.2)

This application relates to a method and apparatus for recording signals on magnetic tape or like material.

The present invention is concerned with recording of electrical signals on magnetic tape wherein the tape surface has remained somewhat roughened after its manufacture, or has been roughened due to wear in previous use, or where residual noise signals remain on the tape after erasure of a previous recording.

The invention is of particular significance with regard to video tape and magnetic recording of television programs and the like. During prolonged use of such tape, the tape suffers gradual abrasion, and thus during play back of a recorded program the signal-to-noise ratio decreases and finally reaches such a level that the tape must be discarded. It is also possible that the tape may have an inherently low signal to noise ratio if proper care was not exercised during its manufacture. In any event, if irregularities in the unrecorded tape surface produce a noise signal, of if residual noise is present after erasure of a previous recording, essentially this same noise signal will remain to be superposed on any program which is recorded on the tape, and during playback the program read from the tape will include the noise signals in the recorded program. Obviously, this will result in undesirable distortion of the recorded program, and it may be that the noise signal will be of sufficient magnitude to make the recording substantially useless.

The primary object of the present invention is to provide a method and system for recording which corrects for the inherent noise present on magnetic tape or like record material to provide a low noise output during play back of the recorded program.

In a typical video or audio tape recorder the recording heads are mounted on the periphery of a spinning disk and are thus caused to trace out a series of closely spaced transverse lines across a magnetic tape which is moved relative to this disk. The rotational axis of the disk is perpendicular to the tape, and usually more than one recording head is mounted on the periphery of the disk, and the linear speed of the recording heads so mounted is so synchronized with the advancing speed of the tape that successive arcs are spaced in proper juxtaposition on the tape, maintaining the continuity of the recorded program.

In accordance with the invention a reading or pickup head is located a fixed distance, preferably very short, ahead of the recording head such that the reading head traces essentially the same path across the tape along which the recording head follows. The reading head thus may sense noise signals present on the tape before recording, and this noise signal is fed through an appropriate delay amplifier and signal conversion circuit, producing a resulting noise correction signal which is introduced into the program recording amplifier along with the program signal.

The combination of these two signals, which is essentially a noise compensated program signal, is then supplied to the recording head and the recorded program is therefore corrected for the noise present on the tape prior to such recording. The delay characteristics of the delay amplifier are so adjusted as to account for the time differential between tracings over the same path by the reading and recording heads, and if desired a speed sensing device can be made to control the amount of time delay in such amplifier.

Accordingly, other objects of this invention include the provision of a magnetic recording apparatus including circuits for reading, inverting, delaying and combining a noise signal from the tape with a program signal to provide a noise compensated signal which is recorded on the tape, lowering the effective noise of the recorded program.

Another object of this invention is to prolong the useful life of magnetic tape or like recording material by use of the method and apparatus above described.

Other objects and advantages of the invention will be apparent from the following description, the accompanying drawings and the appended claims.

In the drawings—

Figures 1, 2, 3, 4:
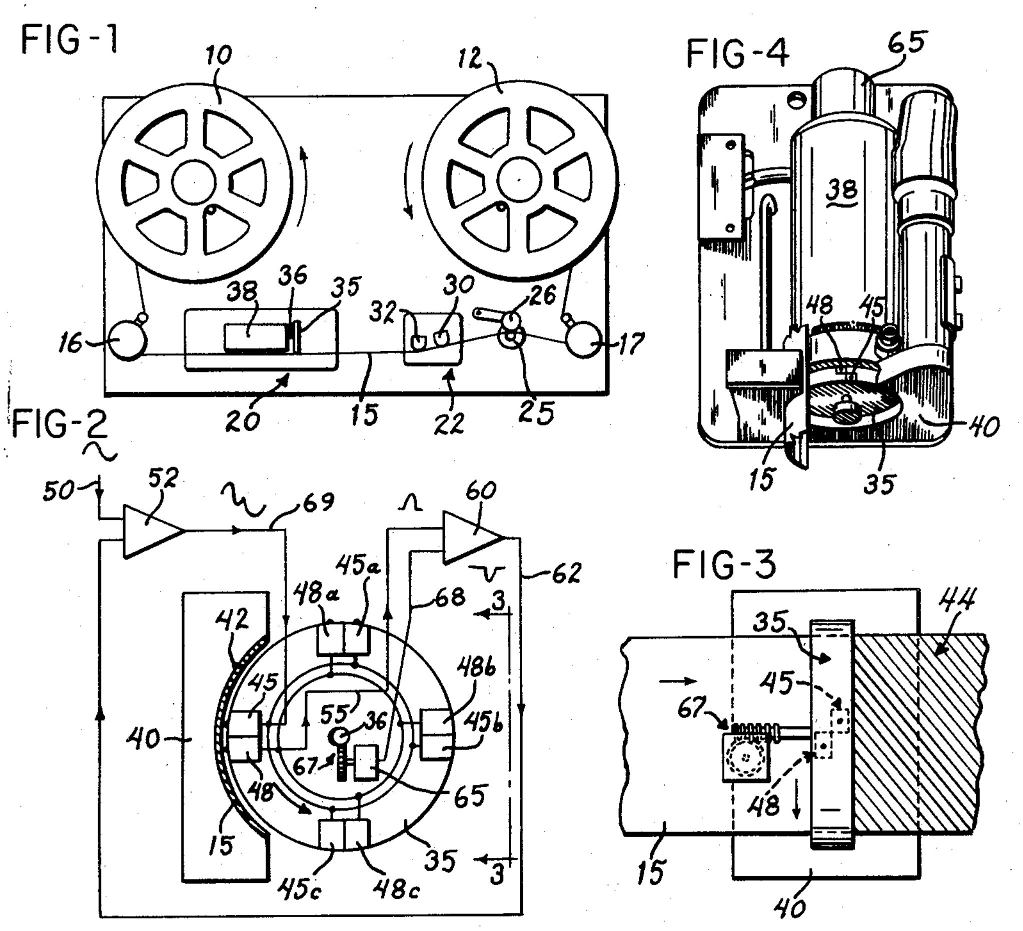
Fig. 1 is a somewhat schematic layout of the tape transport system and recording heads.
Fig. 2 is a schematic diagram showing the arrangement of the reading and recording heads with reference to the tape and including a block diagram of a suitable circuit in accordance with the invention.
Fig. 3 is a somewhat schematic view of the recording heads and tape guideway taken generally along the line 3—3 of Fig. 2.
Fig. 4 is a perspective view of a recording unit such as shown diagrammatically in Figs. 1–3.

Referring to the drawing, which illustrates preferred embodiments of the invention, a conventional tape transport mechanism is shown in Fig. 1 as including a supply reel 10 and a take-up reel 12 which rotate in the direction of the associated arrows during a recording operation. The tape 15 passes around guide pulleys 16 and 17 at opposite corners of the tape deck and in between these pulleys the tape passes a video recording station 20 (Figs. 1 and 4) and an audio recording station 22, also passing between a capstan 25 and its associate idler 26.

The audio station includes an audio recording head 30 and suitable erase and control heads 32 which may be used, for example, to erase a previous signal from tape 15, as well known in the art. At the video recording station there is a revolving video-head drum or disk 35 which rotates on a shaft 36 extending parallel to the direction of travel of tape 15, and driven by a head drum motor 38.

The tape 15 moves at a predetermined relatively slow speed from reel 10 to reel 12 during recording and passes over a guideway 40 which includes a concave surface 42 complementary to the outer surface of drum 35, shaping the linearly advancing tape to conform to the periphery of the recording drum. The drive for the tape advance mechanism is coordinated with the speed of rotation of video head drum 35 in a manner, in accordance with well known current practice, such that successive diagonal lines 44 are transcribed across the tape in proper juxtaposition, maintaining the continuity of the recorded program.

In accordance with the invention the drum 35 carries a recording head 45 in its periphery, and in advance of the recording head there is a reading head 48 which is spaced ahead of recording head 45, in the direction of rotation, a predetermined distance, and spaced in advance of recording head 45, in the direction of travel of the tape past the drum 35, by such a predetermined distance, preferably related to the relative movement between the drum and the tape, that each path 44 traced by reading head 48 and by recording head 45 across the surface of the tape 15 is essentially the same.

For practical purposes, for example to lower the required rotational speed of the drum 35, a plurality of such pairs of recording and reading heads are provided on the periphery of drum 35, designated 45*a* and 48*a*, 45*b* and 48*b*, and 45*c* and 48*c*, with the heads in each pair spaced similarly with respect to each other and spaced about on the periphery of the drum a distance at least equal to the width of tape 15, such that no two pairs of heads will be scanning the tape at the same time. The outputs of the recording and reading heads, respectively, are connected in parallel as shown, or they may be commutated so that only the active heads are connected to the external circuitry.

Assuming that the tape has previously been erased and carries only noise signals due to residual magnetization and/or due to irregularities of the magnetic material, the system functions as follows. The signal to be recorded is supplied to the input line 50 of the program amplifier 52, which is capable of adding two signals at its input. A typical circuit of this type is disclosed in Fig. 23, section 19, of The Radio Engineering Handbook, 3rd edition, McGraw-Hill Publishing Co., 1941.

The reading head 48 scans a path across tape 15 and a noise signal is transmitted through its output line 55 to a conventional delay amplifier circuit 60. A typical amplifier circuit of this type is disclosed in Fig. 4 on page 128 of Electronics Engineering Manual, volume 8, McGraw-Hill Publishing Co. This circuit preferably includes an odd number of amplifier stages, resulting in a signal inversion, as well known in the art, and thus an inverted compensating noise signal is transmitted through the output line 62 of amplifier 60.

All amplifier circuits have some inherent delay time, which represents the time an input signal requires to appear at the output. It is possible to lengthen this delay by introducing standard well known networks of inductances, capacitances, and resistances between the plate circuit of one tube and the grid circuit of the following tube. In many circumstances a fixed time delay amplifier 60 will be sufficient, since the recorder runs at a very closely controlled synchronous speed. However, if closer speed control is necessary a tachometer 65 may be driven through a suitable worm and gear drive 67 from shaft 36, and the output of tachometer 65 transmitted through line 68 to the delay and inverting amplifier 60. Any suitable tachometer may be used for this purpose, such for example as the model TR 501 tachometer supplied by Nacimco Products Company of National City, California, and described in literature published for that company. This tachometer output signal through line 68 may be used, for example, to place variable voltage across the time delay controlling components of the amplifier, such as voltage-variable capacitors described in Electronic Industries of May 1958.

The inverted and delayed noise compensating signal passes through output line 62 to the program amplifier 52 which combines this delayed compensation signal with the program signal to be recorded from line 50. The resultant noise-compensated program signal is passed through amplifier output 69 to the recording head 45. Obviously, the delay time between sensing or pickup of a noise signal by reading head 48, and recording of the corresponding noise compensation signal together with the program signal by recording head 45, must correspond to the time differential between passage of reading head 48 and recording head 45 over the same spot on the tape. The delay time of program amplifier 52 will be known, and the necessary delay time for delay and inverted amplifier circuit 60 may be designed into that circuit, or controlled by the variable tachometer output as above described. In either event, the noise compensated program signal recorded on the tape provides a suitable output signal by which subsequent pick-up of the noise on the tape is eliminated through the process described above, and only the input program signal is received during a further reading of the recorded signals from the tape.

Figure 5:
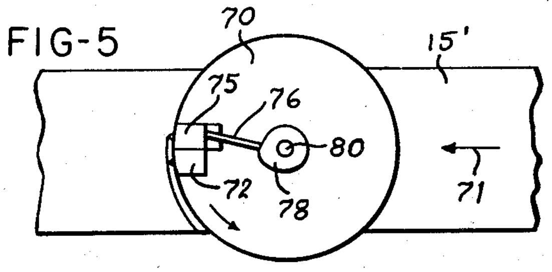
Figs. 5 and 6 are schematic drawings of a modified form of scanning device for mounting the reading and recording heads.
Figure 6:
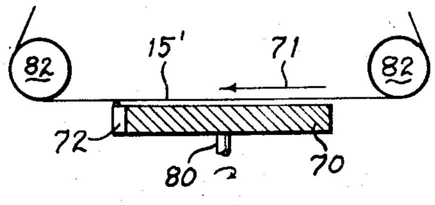

Figs. 5 and 6 disclose a different embodiment of the invention, wherein a revolving disk 70 is employed instead of the drum 35, with the axis of rotation of disk 70 extending normal to the surface of tape 15', and with the tape moving during recording in the direction of arrow 71. The reading head 72 thus transcribes an arc across the surface of tape 15', and the recording head 75, which follows a reading head, is displaced during its passage over the tape by engagement of a push rod 76 with a cam 78 mounted in stationary position about the rotating drive shaft 80 of disk 70. In this manner the position of recording head 75 can be compensated during traverse of the tape so that the arcs traced by the two heads will be essentially the same, and the appropriate output and input connections are the same as above described in connection with Fig. 2.

Referring to Fig. 6, the guiding rollers 82 provide a guideway for tape 15', maintaining a portion of the tape in flat proper position with relation to the rotating disk 70. Thus, the reading head 72 traverses the moving tape 15' in successive arcuate paths spaced successively along the length of the tape, and the reading head 75 follows the recording head over each of these paths, due to the adjustment in its travel provided by push rod 76 and cam 78. Of course, if desired further pairs of reading and recording heads can be provided in the rotating disk 70, in the manner shown in connection with the drum 35 in Fig. 2.

The present invention, therefore, provides a method and apparatus for prolonging substantially the useful life of magnetic recording material such as recording tape, since the noise inherent in the tape or remaining thereon after previous signal erasures, is substantially compensated and the signal to noise ratio may be kept within useful limits even though the noise on the tape may have risen considerably during use. Therefore, the reproduction of the recorded signal will be substantially free from noise disturbances and the tape may be used over again a number of times without undesirable noise during playback of a recorded program.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:

1. Apparatus for recording magnetic signals upon tape and like record materials, comprising means for supporting the tape to guide a portion thereof past a recording station during travel of the tape along its length at a predetermined linear speed, a recording head and a pick-up head, means mounting said heads in predetermined fixed relation to each other, drive means connected to move said mounting means continuously in a direction to scan the tape successively in a transverse direction first by said pick-up head and then by said recording head, the mounting relation between said recording and pick-up heads and the scanning speed of said drive means being related to the linear speed of said tape to scan the same portions of the tape successively by said pick-up head and said recording head in that order, a delay and inverting amplifier circuit connected to receive signals from said pick-up head and producing inverse output signals delayed in accordance with the time differential between scanning of the spot on said tape by said pick-up and recording heads, a recording amplifier connected to receive input signals for recording on the tape and including means for combining input signals with the inverse output signals from said delay amplifier to produce a noise compensated output signal, and an output connection between said recording amplifier and said recording head to transmit the noise compensated recording signal for recording thereof on the tape.

2. Apparatus for recording magnetic signals upon tape and like record materials, comprising means defining a recording station, means for supporting the tape to guide a portion thereof past said recording station in a substantially linear direction, a recording head and a pick-up head, means mounting said heads in predetermined fixed relation to each other, drive means connected to rotate said mounting means continuously in a direction to scan across said tape at said recording station, means for moving said tape past said recording station at a substantially constant linear speed related to the rotational speed of said drive means, the mounting relation between said recording and pick-up heads being such that said pick-up and recording heads scan the tape in that order over the same transverse path, means receiving signals from said pick-up head including a delay circuit and an inverting circuit adapted to produce inverse output signals delayed in accordance with the time differential between scanning of the same spot on said tape by said pick-up and recording heads, an input circuit connected to said recording head for supplying a program signal to be recorded on the tape, and means providing a circuit connection between said delay and inverting circuits and said input circuit for superimposing the inverted and delayed noise compensating signal upon the program signal supplied to said recording head.

3. Apparatus for recording magnetic signals upon tape and like record members, comprising a guide for supporting the tape, means for moving the tape along said guide, a recording head having an input connection for receiving signals to be recorded on the tape, means mount- said recording head for movement transversely of said guide, drive means connected to said mounting providing continuous traversing movement thereof, a pick-up head having an output connection, means mounting said pick-up head for movement transversely of said guide in the same direction as and in predetermined relation to said recording head, means connected to drive said pick-up head mounting in synchronous relation to said recording head, delay and inverting circuit means connected to receive the output of said pick-up head and produce a corresponding correction signal, input circuit means for receiving signals to be recorded, means having input connections from said input means and from said delay and inverting circuit means producing a composite signal at its output, and a connection between said output of said last mentioned circuit means and said input of said recording head to provide a recording signal which includes compensation for noise on the tape.

4. Recording apparatus of the character described comprising a guide for supporting a moving strip capable of retaining magnetic signals thereon, a recording head and a pick-up head, means mounting said heads in predetermined relation, drive means connected to move said mounting means continuously across said guide for scanning successive portions of the strip moving through said guide first by said pick-up head and then by said recording head, a delay and inverting circuit receiving signals from said pick-up head and producing inverse output compensating signals delayed in accordance with the time differential between scanning of the same spot over said guide by said pick-up and recording heads, an input circuit for receiving input signals to be recorded and including means for combining input signals with compensating signals from said delay and inverting circuit to produce a noise compensated composite output signal for recording, and an output connection between said input circuit and said recording head to transmit the composite signal thereto.

5. A magnetic recording system comprising means defining a recording station, transport mechanism for moving recording tape at predetermined constant linear speed along a defined path past said recording station, a recording head and a pick-up head, a rotary mounting for said heads, drive means connected to rotate said mounting in a direction to scan the recording tape transversely of said path first by said pick-up head and then by said recording head over the same portions of the tape, delay and inverting circuit means connected to receive noise signals from said pick-up head due to residual noise on the tape, said circuit means providing an inverted output signal derived from the noise input and delayed in accordance with the time differential between passage of said pick-up and recording heads over the same spot on the tape, input means for receiving a program signal to be recorded and having an output connection to said recording head, and means directing the output signal from said circuit means to said input means for superimposing the inverted and delayed noise signal on the program signal to compensate in the recorded signal for the residual noise signals on the tape.

6. A magnetic recording apparatus comprising means defining a recording station, transport mechanism for moving recording tape at predetermined constant linear speed along a defined path past said recording station, a recording head and a pick-up head, means mounting said heads spaced in the direction of travel of the tape at said recording station to scan the tape first by said pick-up head and then by said recording head, delay and inverting circuit means connected to receive noise signals from said pick-up head due to residual noise on the tape, said circuit means providing an inverted output signal derived from the noise input and delayed in accordance with the time differential between scanning of the same spot on the tape by said pick-up and recording heads respectively, input means for receiving a program signal to be recorded and having an output connection to said recording head, and means directing the output signal from said circuit means to said input means for superimposing the inverted and delayed noise signal on the program signal to compensate in the recorded signal for the residual noise signals on the tape.

7. A magnetic recording system comprising means defining a recording station, transport mechanism for moving recording tape at predetermined constant linear speed along a defined path past said recording station, a recording head and a pick-up head, a recording drum having said heads mounted in spaced relation to each other both axially and peripherally on the surface of said drum, means supporting said drum with the axis thereof extending parallel to the said path at said recording station and with said pick-up head in position to scan first over said tape, drive means connected to rotate said drum for scanning said heads transversely of said tape at a speed such that said recording head follows the same transverse path across the tape as the pick-up head has previously scanned, delay and inverting circuit means connected to receive noise signals from said pick-up head due to residual noise on the tape, said circuit means providing an inverted output signal derived from the noise input and delayed in accordance with the time differential between passage of said pick-up and recording heads over the same spot on the tape, input means for receiving a program signal to be recorded and having an output connection to said recording head, and means directing the output signal from said circuit means to said input means for superimposing the inverted and delayed noise signal on the program signal to compensate in the recorded signal for the residual noise signals on the tape.

8. A magnetic recording system comprising means defining a recording station, transport mechanism for moving recording tape at predetermined constant linear speed along a defined path past said recording station, a recording head and a pick-up head, a mounting disk for said heads including a drive shaft extending normal to the surface of said tape along said path, said pick-up head being mounted in fixed relation on said disk for scanning across said tape, means mounting said recording head for movement radially of said disk during rotation thereof with said disk, drive means connected to rotate said disk in a direction to scan the recording tape transversely first by said pick-up head and then by said recording head, means for adjusting the position of said recording head radially of said disk during scanning thereof across said tape for causing said recording head to scan essentially the same path previously scanned by said pick-up head, delay and inverting circuit means connected to receive noise signals from said pick-up head due to residual noise on the tape, said circuit means providing an inverted output signal derived from the noise input and delayed in accordance with the time differential between passage of said pick-up and recording heads over the same spot on the tape, input means for receiving a program signal to be recorded and having an output connection to said recording head, and means directing the output signal from said circuit means to said input means for superimposing the inverted and delayed noise signal on the program signal to compensate in the recorded signal for the residual noise signals on the tape.

References Cited in the file of this patent

UNITED STATES PATENTS

| | | |
|---|---|---|
| 2,685,079 | Hoeppner | July 27, 1954 |
| 2,704,790 | Gratian | Mar. 22, 1955 |
| 2,713,676 | Fleming | July 19, 1955 |
| 2,807,797 | Shoemaker | Sept. 24, 1957 |
| 2,866,012 | Ginsburg et al. | Dec. 23, 1958 |
| 2,871,464 | Wright et al. | Jan. 27, 1959 |